April 8, 1952 S. E. McCARTHY 2,592,445
FISH LURE
Filed Sept. 15, 1949

Inventor
SEVERUS E. McCARTHY

By Gustave Miller
ATTORNEY

Patented Apr. 8, 1952

2,592,445

UNITED STATES PATENT OFFICE 2,592,445

FISH LURE

Severus E. McCarthy, Sitkum, Oreg.

Application September 15, 1949, Serial No. 115,806

3 Claims. (Cl. 43—41)

This invention relates to a fish lure, and has for an object to provide a fish lure which will be especially attractive to the fish.

A further object of this invention is to provide a fish lure which will be self rotating in the water, and which is basically transparent, and is hollow, whereby live bait, such as a worm, or other bait may be placed therein and appear to be actually in the water, yet is kept so fresh that it may be used for hours without its color or appearance changing.

A further object of this invention is to provide a hollow transparent fish lure which may be baited by having removable and changeable colored materials placed therein, such as by placing differently colored pieces of paper or braid therein for use in shallow waters, or differently colored pieces of metal for use in deep waters.

A further object of this invention is to provide a fish lure made of a transparent plastic material which is initially square in cross section but which has been given a 90° rotation between the ends, which has the effect of making the sides concave and making the lure self-rotating as it is drawn through the water, or held in flowing water, at the end of a swivel, and also has the effect of multiplying the apparent contents, making one worm look like two or three, and also imparting a lifelike effect to the bait or material within the hollow lure.

A further object of this invention is to provide a hollow transparent plastic fish lure which may be readily disassembled for removing and replacing the bait or other material therewithin, and as readily reassembled.

A further object of this invention is to provide a fish lure which may be made in different sizes for different size fish.

With the foregoing and other objects in view, as will hereinafter become apparent, this invention comprises the combinations, constructions and arrangements of parts hereinafter disclosed, claimed, and illustrated on the accompanying drawing, wherein, Figure 1 is an elevational view of the fish lure of this invention.

Figure 1:
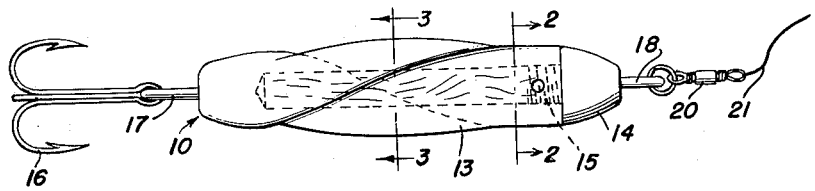

There is shown at 10 the fish lure of this invention. This fish lure 10 consists of a plastic transparent block 11, hollowed at 12, and divided into main hollow body part 13 and a closure part 14 having a threaded male plug 15 cooperating with the hollow body part 13 for closing the receptacle 12 formed therein. At one end of the block, there is provided a multihook 16 having a stem 17 molded into the block 11, while at the other end a stem 18, molded into the block, has a swivel 20 secured thereto for receiving a fishing line 21 thereon.

Figure 2:
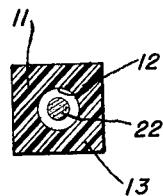
Figure 2 is a sectional view on line 2—2 of Figure 1.
Figure 3:
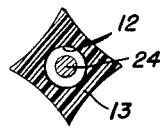
Figure 3 is a section view on line 3—3 of Figure 1.

The block 11 is initially square in cross section as shown in Figure 2, but is given a 90° twist or rotation between its ends, so the end with stem 17 is 90° out of phase with the end with stem 18. This spiral twist causes the sides to become slightly concave as shown in Figure 3. When held in flowing water by the fishing line 21, or drawn through the water, this twist in the block causes the lure 10 to rotate in the water, as well as to apparently multiply the contents of the hollow receptacle 12 formed in the block 11. Access to this receptacle 12 is readily available by merely unscrewing the closure end 14, the main body part 13 being cooperatively female threaded, allowing removal and replacement of the contents. The contents in the receptacle may be varied according to the type of fishing being done. If a worm 22 is used as bait, it is placed in the receptacle 12, and may remain there for hours for an entire day's fishing, without changing color or appearance, a great advantage especially with people who are squeamish on this subject. Other types of bait may be substituted. Instead of using bait, other material, such as colored paper or braid 24, may be used instead.

Due to the hollow receptacle 12, the lure will float or tend to float in shallow waters. For deep water fishing, however, colored metal, such as pieces of twisted welding rod or other strips of metal, appropriately colored, may be inserted in the receptacle, making the lure heavier than water and causing it to sink as desired. Further, it may be made in small size for trout fishing or large size for bass or salmon fishing, or any appropriate size according to the size of fish being sought.

While the invention has been disclosed and illustrated in its preferred form it is to be understood that it is not so limited, and that changes and modifications may be made within the scope of what is hereinafter claimed.

Having thus set forth and disclosed the nature of this invention, what is claimed is:

1. A fishing lure comprising an elongated transparent plastic block, initially square in cross section throughout the major portion of its length between its ends, said block being twisted throughout the major portion of said initially square cross section portion substantially 90° and having concave sides in such twisted portion, said block being divided into two parts, one part being hollowed to provide a bait or lure receptacle therein, the other part forming a threaded closure cooperating with the hollow receptacle member to readily seal the same whereby to preserve the fresh appearance of bait therein indefinitely, and means for securing a fish hook at one end of said block.

2. A fishing lure comprising an elongated transparent plastic block, initially square in cross section throughout the major portion of its length between its ends, said block being twisted throughout the major portion of said initially square cross section portion substantially 90° and having concave sides in such twisted portion, said block being divided into two parts, one part being hollowed to provide a bait or lure receptacle therein, the other part forming closure cooperating with the hollow receptacle member to readily seal the same whereby to preserve the fresh appearance of bait therein indefinitely, and means for securing a fish hook at one end of said block, the twisted transparency of the block appearing to multiply the lure or bait material therewithin.

3. A fishing lure comprising an elongated transparent plastic block, initially square in cross section throughout the major portion of its length between its ends, said block being twisted throughout the major portion of said initially square cross section portion substantially 90° and having concave sides in such twisted portion, said block being divided into two parts, one part being hollowed to provide a bait or lure receptacle therein, the other part forming a threaded closure cooperating with the hollow receptacle member to readily seal the same whereby to preserve the fresh appearance of bait therein indefinitely, means for securing a fish hook at one end of said block, and means for mounting a fishing line including a swivel at the other end, whereby the lure rotates readily thereby making the bait or lure material within the receptacle appear alive, the concave twisted transparency of the block appearing to multiply the lure or bait material therewithin.

SEVERUS E. McCARTHY.

REFERENCES CITED

The following references are of record in the file of this patent:

UNITED STATES PATENTS

| Number | Name | Date |
| --- | --- | --- |
| 1,101,655 | Ness | June 30, 1914 |
| 1,256,155 | O'Brien | Feb. 12, 1918 |
| 1,878,015 | Steffensen | Sept. 20, 1932 |
| 1,892,892 | Jamar | Jan. 3, 1933 |
| 2,078,816 | Shenitz | Apr. 27, 1937 |
| 2,112,385 | Smith | Mar. 29, 1938 |